Figure 1:
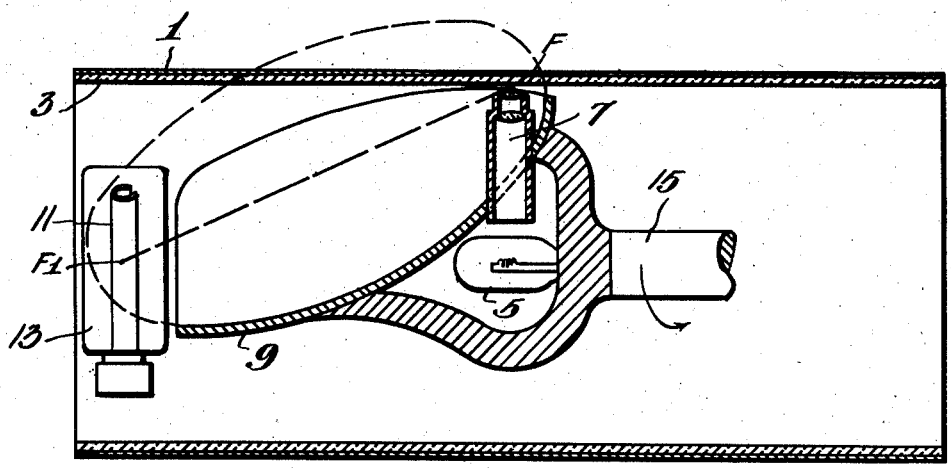

Oct. 13, 1942.  C. J. YOUNG  2,298,911
OPTICAL SYSTEM FOR FACSIMILE TRANSMITTERS
Filed April 1, 1941

Inventor
Charles J. Young
By
Attorney

Patented Oct. 13, 1942

2,298,911

UNITED STATES PATENT OFFICE 2,298,911

OPTICAL SYSTEM FOR FACSIMILE TRANSMITTERS

Charles J. Young, Ardmore, Pa., assignor to Radio Corporation of America, a corporation of Delaware Application April 1, 1941, Serial No. 386,292

7 Claims. (Cl. 178—7.1)

This invention relates to facsimile systems and more particularly to optical systems of the type adapted to be used in facsimile transmitters and has for its primary object to provide a more efficient optical system therefor.

In facsimile transmitting equipment of the type such as shown and described in the Schroter et al. Patent 1,736,407 of February 11, 1930, in which a rotating optical system is positioned inside of a cylinder supporting the subject copy, it has long been endeavored to increase the optical efficiency of the system by increasing the concentration of the scanning spot of light and by increasing the efficiency of the elements which tend to concentrate the resulting modulated light upon the associated light sensitive device.

It has previously been proposed to employ a light source which is stationary on the axis of the rotating equipment and concentrate the light therefrom on the subject copy. It has also been proposed to use a system of reflectors to concentrate the reflected light from the subject copy upon the sensitive element of a photoelectric device such that a train of signals representative of the image on the subject copy may be produced therefrom.

By using the stationary light source it has been found that careful adjustments are necessary in order to provide a scanning spot which remains uniform throughout its scansion and it has been found that when a double ended scanning system, such as shown in the Schroter Patent 1,800,031 of April 7, 1931, is used, it is very difficult to adjust the rotating equipment such that the scanning spot produced by both ends of the optical system will be of substantially the same brilliance and in substantially the same relative position.

Although it has been proposed to rotate the light source in a manner such as shown and described by Nicolson in Patent 1,925,814 of September 5, 1933, it will be noticed that the light source is located in a position not on the axis of the optical system but at a point at which it would be subject to considerable centrifugal force if the optical system was adapted to rotate at a high rate. Furthermore, if the light source is positioned other than at a point along the axis which is perpendicular with respect to the axis to the position of scansion by the light spot at a complicated optical system is necessary in order to efficiently concentrate the light into a spot small enough to be suitable for scanning the subject copy.

Another object of this invention, therefore, is to provide a more efficient method and means for producing a scanning spot.

Still another object of this invention is to increase the efficiency of the light collecting means for concentrating the reflected light on the scanning spot on the light sensitive device.

According to this invention the light source is positioned such that the filament thereof is along the axis of the optical system and at a position from which the pickup point on the subject copy is perpendicular therefrom with respect to the axis of the optical system. An ellipsoidal reflector is employed and so positioned that one of its focal points is at the pickup point on the subject copy and the other of its focal points is on the sensitive surface of the light sensitive device.

Figure 2:
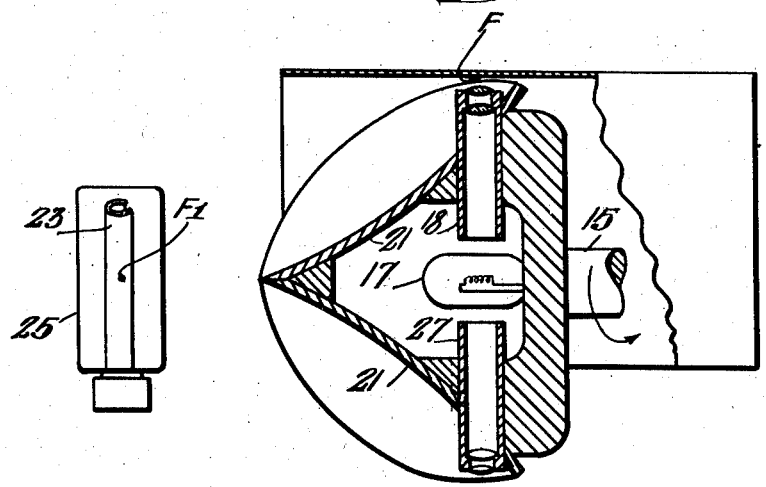

Other and incidental objects of this invention will be apparent to those skilled in the art from the following specification considered in connection with the accompanying drawing in which Figure 1 is a cross sectional view showing one form of this invention, and Figure 2 is a cross sectional view showing another form of this invention in which a multiple ended optical system is shown.

Figure 1 shows one form of this invention in which a single ended optical system is employed to rotate inside of the subject copy I which takes the form of a cylinder supported on the transparent member 3. Such a subject copy supporting member as shown and described in the above identified Schroter Patent 1,746,407 may be employed.

A source of light 5 which takes the form of an electric filament which is positioned on the axis of the optical system produces a greatly reduced image of the filament of the light source 5 which will be termed the point of light F on the surface of the subject copy through the optical system which includes the concentrating lens system 7. This lens system 7 may take the form of a microscope objective or any of the other well-known light concentrating optical systems.

The light reflected from the point F is collected by the ellipsoidal reflector 9 which is so positioned and designed such that one of its focal points is at the point F and the other of its focal points is at the point F''. It will be noticed that the ellipsoid is completed in the dotted line such as to show more clearly the curvature of the ellipsoidal reflector 9. It is preferable that the reflector be as large as physically possible and extend such a distance in all directions as to enable it to collect a maximum amount of reflected light such that an efficient optical system results.

Point F' is located on the light sensitive cathode 11 of a photoelectric device 13. The electrical signal produced therefrom is transmitted in any of the well-known manners.

The portion of the optical system including the lamp 5, the lens system 7 and the reflector 9 is mounted rigidly on the shaft 15 which is adapted to be rotated in synchronism with the optical system at the receiving station.

It will be noticed that by placing the lamp 5 on the axis of the optical system a simple and efficient means is provided for concentrating a point of light on the surface of the subject copy. By rotating the light source 5, it is also possible to provide an optical system which needs a minimum of adjustment.

Figure 2 shows another form of this invention in which there is provided a double ended optical system. It will be seen that this invention lends itself to the provision of a very efficient multiple ended optical system and it is not the intention of the inventor to limit his system to either a single or a double ended system.

A light source consisting of an electric filament 17 is positioned along the axis of the optical system and is adapted to produce a light spot upon the subject copy 19 at point F.

The subject copy takes the form of a half cylinder and may be supported by equipment such as shown and described in my copending application Serial No. 376,872, filed January 31, 1941.

The ellipsoidal reflector 21 is so positioned that one of its focal points is at F and the other of its focal points is at F' on the sensitive element 23 of the photoelectric device 25.

It will be noticed that although in the multiple ended optical system such as shown in Fig. 2, it is not physically possible to provide a reflector 21 having as large a reflecting area as in the form of the invention shown and described in Fig. 1 but it will be noticed that the area of light collection is large with respect to any of the well-known systems.

As the optical system rotates about its axis the scanning spot produced by the end of the optical system including the lens barrel 18 approaches one edge of the subject copy 19, at the same time the end of the optical system including the lens barrel 27 approaches the other edge of the subject copy such that there will be provided a continuous scanning operation. The optical system is symmetrical and the operation is similar for both ends of the optical system.

Such an optical system as shown and described in the examples shown and employing applicant's invention may be adaptable to those systems in which either the optical system or the subject copy moves longitudinally. Such systems are well known in the prior art.

The concentration of the reflected light to a point F' as shown and described in each form of applicant's invention is very desirable in order to obtain the maximum efficiency from a photoelectric device.

While several systems for carrying this invention into effect have been indicated and described, it will be apparent to one skilled in the art that this invention is by no means limited to the particular organizations shown and described, but that many modifications may be made without departing from the scope of this invention as set forth in the appended claims.

I claim as my invention:

1. Picture transmitting apparatus comprising a cylindrical member adapted to support a subject copy to be transmitted, a scanning lens member rotatably supported coaxially with said cylindrical member and whose axis is perpendicular to the axis of said cylindrical member, a light sensitive device on the axis of said cylindrical member, a light source rotatably supported at the intersection of the axis of said cylinder and the axis of said scanning lens member, a reflecting element to rotate with said scanning lens member and one of whose focal points is located at the intersection of said scanning lens axis with said subject copy and the other of the focal points of said reflector located at the intersection of the axis of said cylindrical member with said light sensitive member.

2. Picture transmitting apparatus comprising a cylindrical member adapted to support a subject copy to be transmitted, a scanning lens member rotatably supported coaxially with said cylindrical member, a light sensitive device on the axis of said cylindrical member, a light source cooperating with said scanning lens member, an ellipsoidal reflector to rotate with said scanning lens member and one of whose focal points is located at the intersection of said scanning lens axis with said subject copy and the other of the focal points of said reflector located at the intersection of the axis of said cylindrical member with said light sensitive member.

3. Picture transmitting apparatus comprising a cylindrical member adapted to support a subject copy to be transmitted, a scanning lens member rotatably supported coaxially with said cylindrical member and whose axis is perpendicular to the axis of said cylindrical member, a light sensitive device, a rotatably mounted light source at the intersection of the axis of said cylinder and the axis of said scanning lens member, an ellipsoidal reflector to rotate with said scanning lens member and to concentrate the reflected light rays from scanning lines of the subject copy on said light sensitive device.

4. Picture transmitting apparatus comprising a cylindrical member adapted to support a subject copy to be transmitted, a scanning lens member rotatably supported coaxially with said cylindrical member and whose axis is perpendicular to the axis of said cylindrical member, a light sensitive device on the axis of said cylindrical member, a light source at the intersection of the axis of said cylinder and the axis of said scanning lens member, an ellipsoidal reflector to rotate with said scanning lens member and one of whose focal points is located at the intersection of said scanning lines axis with said subject copy and the other of the focal points of said reflector located at the intersection of the axis of said cylindrical member with said light sensitive member, and the reflecting surface of said reflectors extending the greater portion of the distance between said focal points.

5. Picture transmitting apparatus comprising a cylindrical member adapted to support a subject copy to be transmitted, a scanning lens member rotatably supported coaxially with said cylindrical member and whose axis is perpendicular to the axis of said cylindrical member, a light sensitive device on the axis of said cylindrical member, a light source at the intersection of the axis of said cylinder and the axis of said scanning lens member, an ellipsoidal reflector to rotate with said scanning lens member and one of whose focal points is located at the intersection of said scanning lens axis with said subject copy and the other of the focal points of said reflector located at the intersection of the axis of said cylindrical member with said light sensitive member, and said reflector being the sole means for changing the direction of a light ray from the intersection of said scanning lens axis with said subject copy to the intersection of the axis of said cylindrical member with said light sensitive member.

6. Picture transmitting apparatus comprising a curved member adapted to support a subject copy to be transmitted, a plurality of scanning lens members rotatably supported coaxially with said curved member, a light sensitive device on the axis of said curved member, a light source at the perpendicular intersection of the axis of said curved member and the axis of each of said scanning lens members, an ellipsoidal reflector cooperating with each of said scanning lens members and a focal point of each of said reflectors located at the intersection of its associated scanning lens axis with said subject copy and the other of the focal points of each of said reflectors located at the intersection of the axis of said curved member with said light sensitive member.

7. Picture transmitting apparatus including a curved member to support a subject copy, a scanning lens member rotatably supported coaxially with said curved member and whose axis is perpendicular to and intersects the axis of said curved member, a light sensitive device on the axis of said curved member, a light source including a filament whose greater dimension lies along the axis of said curved member at the axis of said lens member, and a reflecting element to rotate with said scanning lens member.

CHARLES J. YOUNG.